United States Patent Office 2,757,414
Patented Aug. 7, 1956

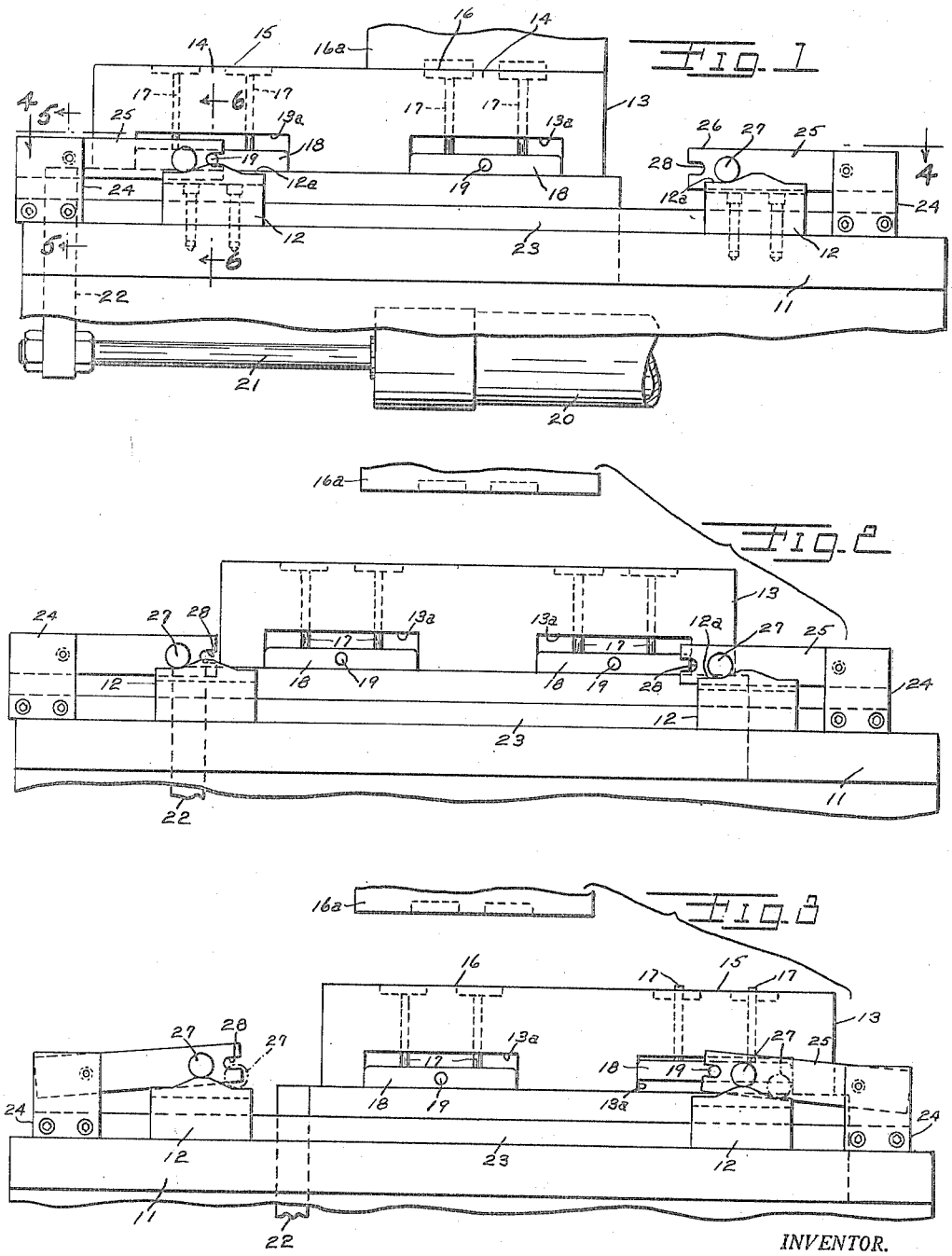

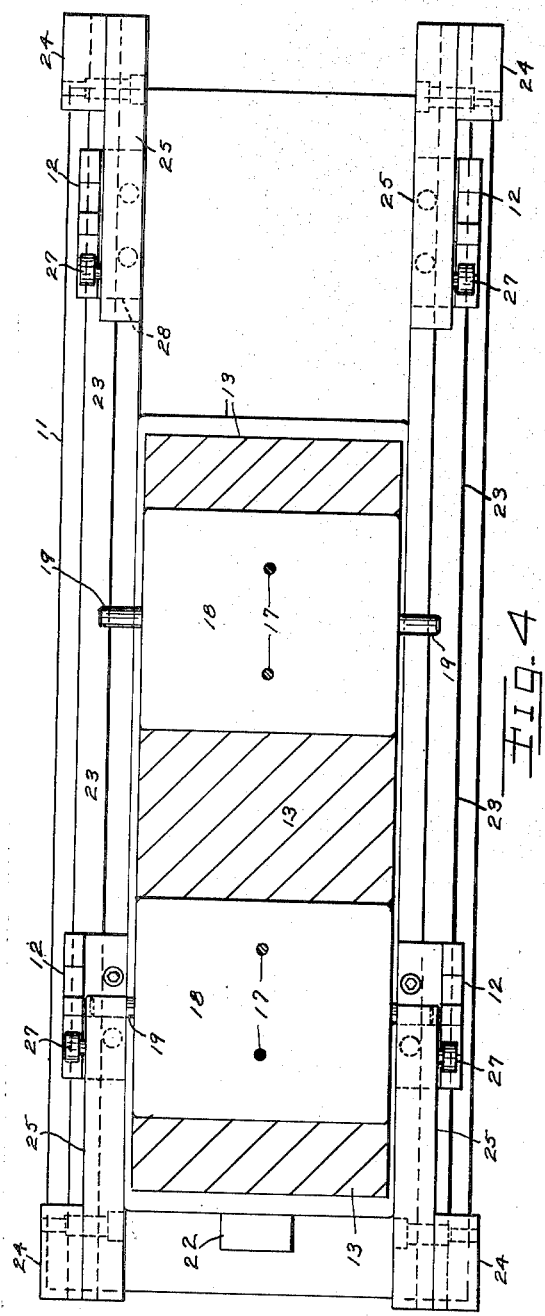

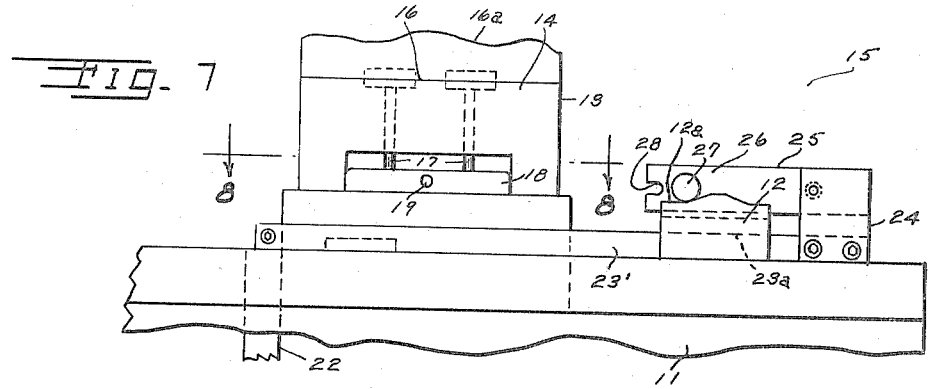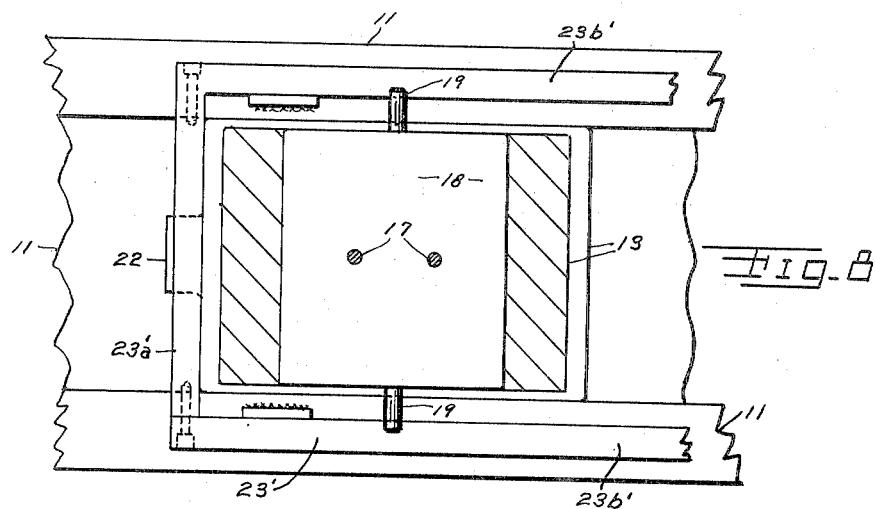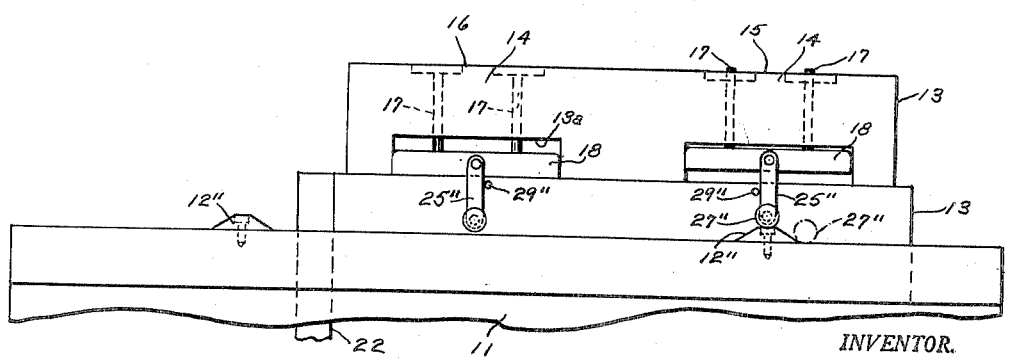

2,757,414
KNOCK-OUT DEVICE FOR MOLDING MACHINE

Roger S. Chaloupka, Cleveland, Ohio, assignor to Mosle Machinery Company, Cleveland, Ohio, a corporation of Ohio Application August 25, 1951, Serial No. 243,630

10 Claims. (Cl. 18—16)

This invention relates to a work holder and more particularly to a work holder having a work piece ejector, or knockout device.

An object of the present invention is to provide a work holder having a work piece ejector operable when the work holder moves from the work processing station to the work unloading station but inoperative during the travel of the work holder from the work loading station to the work processing station.

Another object of the present invention is to provide a work holder for a plastic molding machine having a work piece ejector operable when the work holder moves from the molding station to the work unloading station but inoperative during the travel of the work holder from the work loading station to the molding station.

Other features of my invention reside in the arrangement and design of the parts for carrying out their appropriate functions.

Other objects and advantages of my invention will be apparent from the accompanying drawings and description, and the essential features thereof will be set forth in the appended claims.

In the drawings,

Fig. 1 is a side elevational view of a knock-out device for a molding machine or work ejection device in a work holder;

Fig. 2 is another view similar to Fig. 1 but with the elements of the knock-out device in a different position;

Fig. 3 is a side elevational view of the knock-out device with the ejector pins in the right-hand side of the work holder in their raised or ejecting position;

Fig. 4 is a longitudinal sectional view taken along the lines 4—4 of Fig. 1;

Fig. 5 is a vertical sectional view, enlarged, through the pivot point of the cam follower along the lines 5—5 of Fig. 1;

Fig. 6 is a vertical sectional view, enlarged, taken along lines 6—6 of Fig. 1;

Fig. 7 is a fragmental side elevational view of a modified form of knock-out device for a molding machine or work ejection device in a work holder;

Fig. 8 is a fragmental longitudinal sectional view taken along the line 8—8 of Fig. 7; while Fig. 9 is a side elevational view of another modified form of knock-out device for a molding machine or work ejection device in a work holder.

Referring to the invention shown in Figs. 1 to 6, the work holder or knock-out device consists of a stationary base 11 having knock-out cams 12 near the four corners thereof, as seen in Fig. 4. Cam follower positioning surface 12a is a horizontal surface on each side of the cam lobe. This positioning surface will be described in further detail later in the specification. Although there are four cams shown, it is clear that modifications within the scope of this invention may require fewer cams. Since the mechanism coacting with each of the cams is identical, the description will be confined to the mechanism coacting with one cam only.

Work holder slide 13 contains one or two work holder elements or lower mold die sections 14 of a plastic molding machine. The reciprocating slide moves the work holder elements or molds between the unloading and loading stations 15, on each side of the upper mold or die 16a, and the processing station or plastic molding injection station 16 under the upper mold 16a. A practical application of this knock-out device would be to use it on the plastic molding machine in the copending application of E. P. Moslo, Serial No. 192,772, filed October 28, 1950, and now abandoned, wherein metal prongs are positioned in dies 14 at the work loading station, after which the dies move to the processing station where plastic is injected into the mold to form an electric cord plug. However, this knock-out device may be used in many other types of work processing machines such as metal working, stamping, molding, etc., in which the work piece is loaded into the work holder, processed and then ejected.

The means to eject the work is disclosed in Figs. 1 to 6 as being ejector pins 17. However, this invention is not limited to pin ejectors only but may include plate ejectors and many other types. The ejector pins 17 are reciprocated vertically by the knock-out plate 18 actuated by a laterally projecting pin or pin-operator 19. Plate 18 is movable vertically in pocket 13a in slide 13.

The work holder slide 13 is reciprocated on base 11 by a fluid actuated motor 20. This motor moves a piston rod 21 which actuates a vertical link 22 attached to the slide 13. Of course, applicant's invention contemplates other types of slide moving means, for example, the conventional rack and pinion drive.

A second slide carries the means to translate the horizontal reciprocation of the work-holding slide 13 into a vertical movement of the ejector pins 17. This slide, as shown in the drawing, comprises two slides 23, one on each side of the work-holder slide 13. Although there are two slides shown, it is clear that one slide might work satisfactorily. Since both slides are identical, only one will be described. Slide 23 is mounted in a slot 23a cut in the base of cam 12. Slide 23 has a vertical member 24 at each end but only one will be described since they are identical. Pivoted cam follower or ejector lever 25 is pivotally mounted to the top of the vertical member 24. The ejector lever consists of a pivoted arm 26 and a roller follower or cam roller 27. Of course, the invention contemplates in place of the cam follower 27 the use of a fixed disc, projecting pin, or any other type of cam follower surface which will engage cam 12 and perform the function desired. Each ejector lever 25 has a slot 28 in its distal end. The slots in levers 25 of slide 23 mutually face each other inwardly and the spacing between them is greater than the distance between the pins 19 that engage the slots.

The operation of this work-holder or knock-out device is best understood by looking at Figs. 1, 2 and 3, as the device is applied to a plastic molding machine. In Fig. 1, the upper mold 16a is engaged with the lower mold 14 at the work processing station 16 while another work piece is being inserted into the work-holder element 14 at loading station 15 to the left of the upper mold 16a. After an injection operation at station 16 to form the piece defined by mold section 16a and 14 around the inserted work piece or metal prongs and the upper mold 16a has been raised, as seen in Fig. 2, the work holder slide 13 is moved to the right by motor 20 and knock-out plate pin or pin-operator 19 in the left side of the work-holder slide 13 leaves the slot 28 so that the ejectors pins 17 in the left work-holder element will not be actuated during the travel of the work-holder from the work loading to the processing or molding station. The free movement of slide 13, during which both ejector plates remain in their lowered position since pins 19 do not engage slots 28, constitutes the greatest portion of the slide travel. Cam follower positioning surface 12a on the right-hand side of Fig. 2 supports the cam roller 27 so as to prealign slot 28 level with pin 19. As slide 13 moves further to the right, the pin and the slot on the right engage and move the slide 23 and cam follower 27 on lever 25 toward the right so that the cam roller will be raised by the fixed cam 12, as shown in Fig. 3. This will raise the pin 19, knock-out plate 18 and the ejector pins 17 from the position shown in Figs. 2 and 6 to that shown on the right in Fig. 3. The raised ejector pins 17 knock-out or eject the molded and completed work piece or electric cord plug. Then, when slide 13 has moved to the right to the work loading position wherein the cam roller 27 has reached its dot-dash position at the right in Fig. 3, the ejector pins 17 will be in their lowered position, as seen at the left in Fig. 1, so that work holder element 14 may be loaded with an inserted work piece or the metal prongs, previously referred to in discussing heretofore the E. P. Moslo application, Serial No. 192,772, now abandoned. When slide 13 moves to the left to return from this loading position to the position in Fig. 1, a knockout action occurs at the left-hand die 14 in slide 13 exactly as just described for the right-hand die or work holder element. Naturally, when slide 13 travels from the right to the left position, as set forth above, the ejector pins in the right-hand die do not rise and the inserted work piece or the metal prongs will stay positioned in the die or work holder element for the molding operation at station 16.

The movement of the slide 13 in one direction also resets cam roller 27 for ejection operation during the movement of the slide in the opposite direction. When the slide 13 moves to the right, as described above, the cam roller 27 on the left is reset. Note that in Fig. 2 just before the slide 13 and work holder element 14, moving to the right, reach the ejection position, the cam roller 27 on the right is between the lobes of the two cams 12. As slide 13 moves to the right after right-hand pin 19 engages right-hand slot 28, the movement of the slide 13 to the right of the position of Fig. 3 resets the cam roller 27, shown on the left side of Fig. 3, over onto the right side of the cam lobe, as shown in dot-dash lines, to position it for the next reciprocation of slide 13. Hence, the pins 19 and slots 28 serve as mutually engaging surfaces between slides 13 and 23 to perform a dual function. For example in Fig. 3, they reset cam roller 27 on the left side for the return slide movement and also cause cam roller 27 to engage cam 12 on the right side to raise ejector pins 17.

The modification shown in Figs. 7 and 8 is similar to the one shown in Figs 1 to 6, but only one work holder element 14, instead of two, is used. No cam 12 and cam follower 25 is needed on the left-hand side of base 11. Slide 23' replaces slide 23. Slide 23' has a cross piece 23a' connecting the two slide side elements 23b'. This cross piece serves as a mutually engaging surface between slides 13 and 23' to reset the cam roller 27 over to the left of the lobe of cam 12 during the travel of the slide 13 toward the left from the work loading station to the work processing station. This resetting is performed in a manner similar to that described in the immediately preceding paragraph. The operation of ejection pins 17 is exactly the same as in the knock-out device shown in Figs. 1 to 6.

The modification in Figs. 1 to 6, inclusive, has four cams 12 and four cam followers 25. The modification in Figs. 7 and 8 has only two cams 12 and two cam followers 25. Of course, this invention contemplates another modification (not shown) having only one cam 12 and only one cam follower 25. This later modification is exactly like the modification shown in Figs. 7 and 8 except that only one cam 12, cam follower 25 and slide side element 23b' is used. Cross piece 23a' is replaced by an inwardly directed shoulder on the left end of the remaining slide side element 23b'. This shoulder is adapted to engage the left side of the slide 13 to reset the cam follower 25.

The modification shown in Fig. 9 performs the same function as the previous modifications but its structure is somewhat different. This modification has fixed knock-out cams 12" which do not necessarily have cam follower positioning surfaces. No second slide, such as 23 or 23', with its cam followers is needed. Pivoted cam follower or ejector lever 25" is pivoted to plate 18. This follower consists of a pivoted arm 26" having a roller follower or cam roller 27". When the work holder slide 13 is moved to the right, roller 27" on the right engages cam 12" rotating lever 25" clockwise against pin 29". The pin 29" mounted on slide 13 prevents further clockwise rotation of the lever 25", shown at the right-hand side of Fig. 9.

The operation of this work holder or knock-out device is best understood by looking at Fig. 9. As the work holder slide 13 is moved to the right, the roller 27" on the right engages cam 12". The cam forces the pivoted cam follower 25" to pivot clockwise until it engages pin 29" in slide 13. As the roller climbs the cam lobe, the ejector pins will be raised to eject the work piece. After the work pieces are ejected from the right-hand set of dies as shown in Fig. 9, slide 13 moves farther to the right until pins 17 are again lowered permitting the positioning of new work pieces in the empty dies at the work loading station. During the next travel of slide 13, back toward the left in Fig. 9, from the work loading station to the work processing station, the follower 25" will pivot counterclockwise as it engages the cam 12" and will then ride over the cam without actuating the ejector pins. The knock-out action at the left end of slide 13 in Fig. 9 is similar to that just described for the right end. This invention naturally contemplates the use of only one work holding element or set of dies 14 on slide 13, if desired.

What I claim is:

1. A work holder comprising a base; a work holder slide on the base and adapted to be moved between work loading, unloading and processing stations; a cam on the base adjacent the unloading station; a second slide on said base; a cam follower pivoted to the second slide adjacent said unloading station; said cam follower having a slot in its distal end; a work piece ejector in the work holding portion of the first slide, and a laterally projecting pin from the ejector adapted to engage said slot; mutually engageable surfaces between said first and second slide engageable by movement of said first slide to the processing station; whereby the movement of the first slide to the unloading station causes the pin to engage the slot, the follower to engage the cam, and the ejector to knock out the processed work piece; and whereby movement of the first slide to the processing station from the work loading station removes the pin from the slot, inactivates the ejector, and then resets for the next unloading stroke the cam follower and second slide by engagement of said surfaces.

2. A work holder comprising a base; a work holder slide on the base; said slide having two work holder elements, one for unloading and loading while the work piece in the other is being processed; cams on the base adjacent the ends thereof; a second slide on said base; a cam follower pivoted at each end of the second slide, each follower having a slot in its distal end, the slotted ends mutually facing each other inwardly; slidable ejector pins in each end of the first slide beneath said work holder elements; a pin-operator projecting laterally from said first named slide and operatively connected with its associated ejector pins, each slot being at the level of its associated pin-operator when its follower is in the lower pivoted position, the spacing of said slots being greater than said pin-operators; whereby movement of the first named slide to the right, causes the projecting pin-operator on the right to engage the slot in the associated follower, to move the second slide to the right, to raise the ejector pins in the right-hand end by riding the right follower over the cam, and to move the left follower between the two cams into the pre-ejector position to ready it for the leftward stroke; and whereby the follower, second slide and projecting pin-operator disassociates from the right side of the first slide during the leftward stroke so that ejector pins in the right-hand end will not be raised.

3. A work piece holder comprising a base, a work piece holder slide mounted on the base for motion back and forth between only two positions, said work holder slide having two work piece holder elements therein spaced so that one element is at a work piece processing station while the other is at a work piece loading station at one of said positions and the other element is at the processing station while said one element is at a loading station at the other end of said positions, means for ejecting the work piece in each element as it moves from its processing to loading station, and means responsive solely to slide movement between said positions for de-activating each ejecting means at the loading station and during the return travel of each element to the processing station.

4. A work piece holder comprising a base, a work piece holder slide mounted on the base for motion back and forth over the same path between a work piece processing station and loading station, an ejector in the work piece holder slide to knock out the work piece, means responsive solely to slide movement from the processing to the loading station for advancing the ejector to knock out the work piece and for retracting said ejector at the loading station, means rendering said ejector actuating means inoperative to change the position of the loaded work piece while the slide moves back along the same path from work piece loading to work piece processing stations.

5. A work piece holder comprising a base, a work piece holder slide mounted on the base for the motion back and forth over the same path between a work piece processing station and loading station with a work ejecting position therebetween, an ejector in the work piece holder slide to knock out the work piece, means advancing the ejector to knock out the work piece operable by the slide movement only from the processing station to the loading station through the ejecting position and for retracting the ejector as said slide moves in the same direction from processing to loading stations, said ejector actuating means being inoperative to knock out the loaded work piece while the slide moves back along the same path from work piece loading to work piece processing stations.

6. A work holder comprising a base, a work holder slide on the base mounted for back and forth movement, an ejector slidably mounted in the work holder to eject the work piece, and means responsive solely to slide movement to move the ejector to ejecting position during one direction of the slide movement but to leave the ejector inoperative during the return slide movement, said means comprising a cam fixed relative to the base and a follower adapted to ride on said cam to move the ejector to ejecting position.

7. A work holder comprising a base, a work holder slide on the base mounted for back and forth movement, an ejector slidably mounted in the work holder to eject the work piece, and means to move the ejector to ejecting position and then to return it to inoperative position during one direction of the slide movement but to leave the ejector inoperative during the return slide movement, said means comprising a cam fixed relative to the base and a follower adapted to ride on said cam to move the ejector to ejecting position and to ride past said cam to return the ejector to inoperative position.

8. A work holder comprising a base, a work holder slide on the base mounted for back and forth movement, an ejector slidably mounted in the work holder to eject the work piece, means to move the ejector to ejecting position during one direction of the slide movement but to leave the ejector inoperative during the return slide movement, said means comprising a cam fixed relative to the base, a follower adapted to ride on said cam to move the ejector to ejecting position, said follower being pivotally mounted with respect to and this pivotal connection being slidably mounted with respect to both the base and work holder slide, said follower being contiguous to the work holder slide and being operatively connected to the cam and ejector during the ejector raising operation.

9. A work piece holder comprising a base, a work piece holder slide mounted on the base for motion back and forth between a work piece processing station and loading station with a work piece ejecting position therebetween, an ejector in the work piece slide movable in one direction to knock out the work piece and normally biased to move in the other direction, actuating means advancing the ejector in said one direction against the bias to knock out the work piece and subsequently releasing said ejector so that it will be retracted by said bias as said slide continues its movement in the same direction from processing to loading positions, and means for deactivating said ejector actuating means while the slide moves from work loading to processing stations so that the ejector is inoperative to knock out the loaded work piece.

10. A workpiece holder comprising a base, a workpiece holder slide mounted on the base for motion back and forth over the same path between a workpiece processing station and loading station, an ejector in the workpiece holder slide to knock out the workpiece, means advancing the ejector to knock out the workpiece operable by the slide movement only from the processing station to the loading station, said ejector actuating means being inoperative to change the position of the loaded workpiece while the slide moves back along the same path from workpiece loading to workpiece processing stations, said means including actuating means for advancing the ejector to knock out the workpiece at a spaced distance from the loading station and to permit retraction of said ejector as slide movement continues toward said loading station.

References Cited in the file of this patent

UNITED STATES PATENTS

| | | |
|---|---|---|
| 1,800,849 | Stacy | Apr. 14, 1931 |
| 1,965,732 | Bisterfeld | July 10, 1934 |
| 2,117,400 | Cobb | May 17, 1938 |
| 2,289,102 | Clark | July 7, 1942 |
| 2,354,029 | Kingston | July 18, 1944 |